Dec. 29, 1959  R. E. RICHARDSON  2,918,755
GLASS BENDING MOULDS
Filed June 18, 1956  3 Sheets-Sheet 1
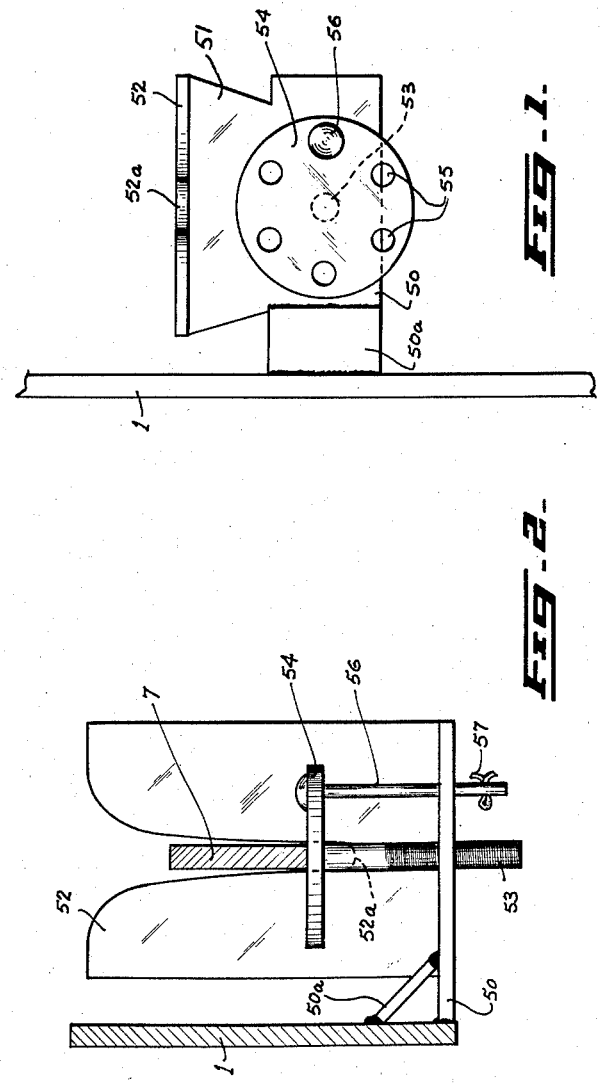
INVENTOR:
RONALD E. RICHARDSON
By Cushman, Darby & Cushman
ATTORNEYS

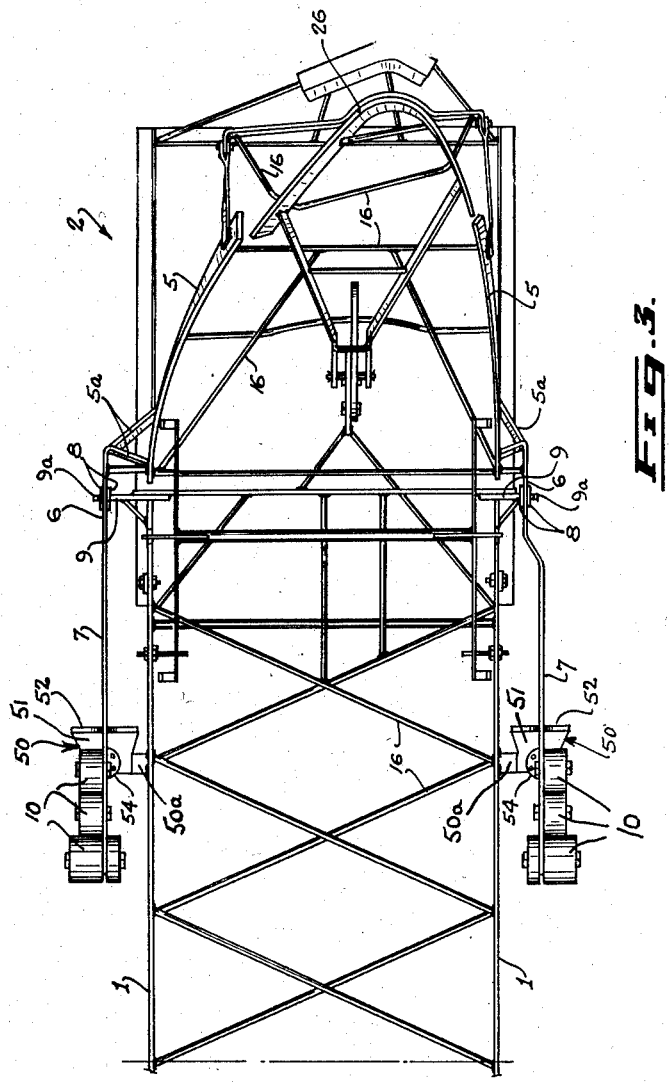

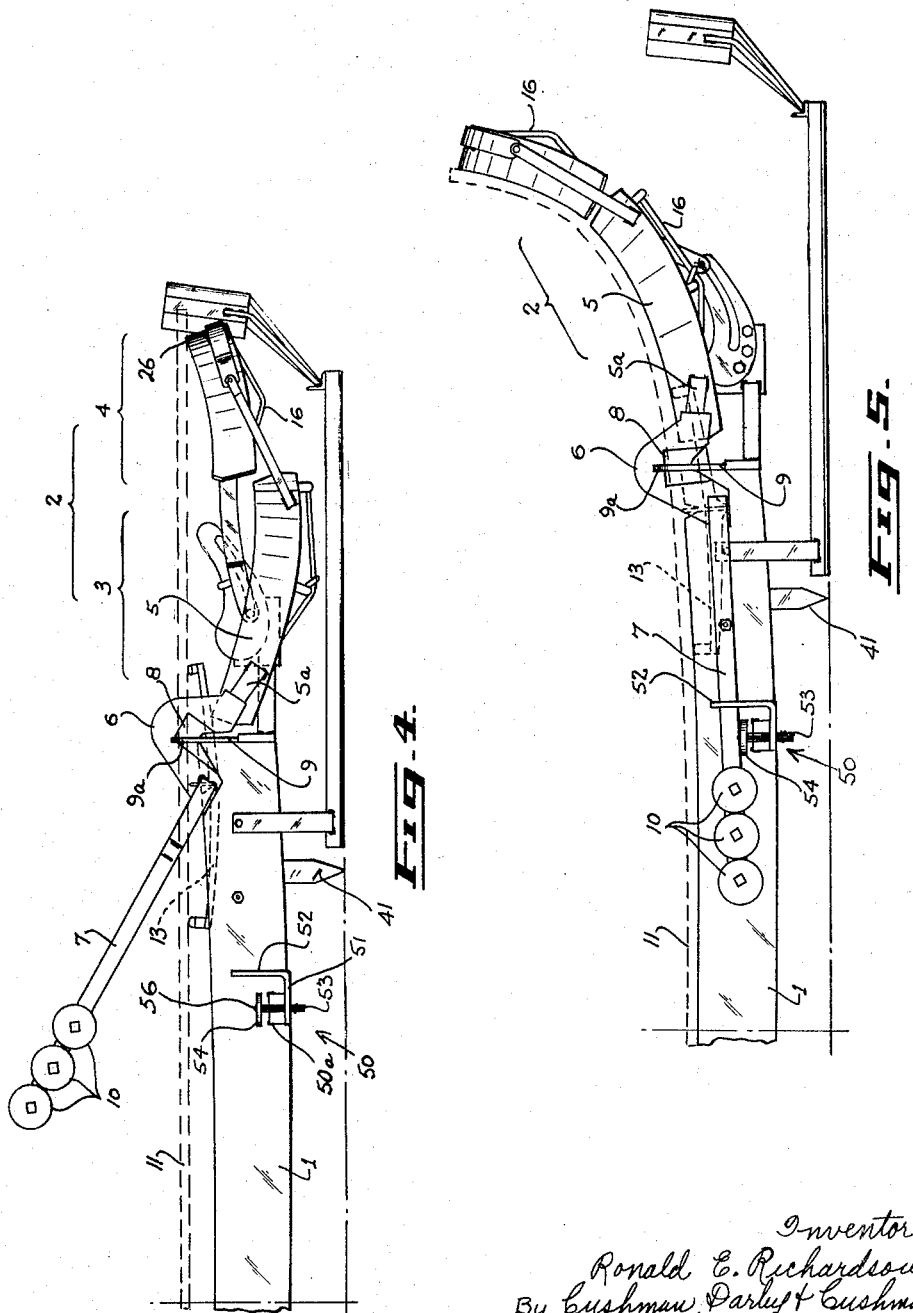

United States Patent Office 2,918,755
Patented Dec. 29, 1959

2,918,755
GLASS BENDING MOULDS

Ronald E. Richardson, Oshawa, Ontario, Canada, assignor to Pittsburgh Plate Glass Company, Pittsburgh, Pa.

Application June 18, 1956, Serial No. 592,189

Claims priority, application Canada July 2, 1955

5 Claims. (Cl. 49—67)

This invention relates to improvements in the construction of moulds such as are employed in the bending of elongated glass sheets to curved form. The advent of "wrap-around" windshields in automobile design has given rise to the need for efficient moulds for the initial processing of the elongated glass sheets that will ultimately form the laminated safety glass of such "wrap-around" windshield. A "wrap-around" windshield consists of an elongated sheet of laminated glass of gentle curvature at its centre, the radius of curvature decreasing sharply at each end until the glass is extending almost perpendicular to the main body of the glass.

The technique employed in forming such "wrap-around" windshields, or like objects of curved laminated glass for automobile rear windows or other applications, is to lay a pair of flat elongated glass sheets on a mould which is so arranged as to tend to take up its final configuration when so permitted by the softening of the glass. The mould and glass sheets are passed through a furnace in which the glass is raised to a temperature sufficient to render it yieldable to the forces exerted upon it by the mould. In this manner the required shape is imparted to the glass. Subsequently the two sheets are annealed, an intermediate lamination of a synthetic resinous material is placed between them and they pass to the rolling and pressure treatments before emerging as a finished product. A similar bending operation is employed in manufacturing the tempered type of non-laminated safety glass.

The present invention is concerned with the construction of moulds for the preliminary bending of one or more such sheets during passage through a furnace.

It has become the practice to form moulds for this purpose with pivoted end portions each of which either can be swung into a first position (when the flat, cold glass is originally placed in position thereon) or can move into a second position as the resistance to bending of the glass decreases on exposure to higher temperatures. Weights tending to urge the movable portions of the mould into such latter positions are normally provided.

It is the primary object of the present invention to provide means for accurately controlling the movement and position of such end mould portions.

Thus, the invention, in one aspect consists of a glass bending mould having a main mould portion, at least one subsidiary mould portion pivotally connected to said main mould portion, means tending to urge said subsidiary mould portion to one extreme position of pivoting, adjustable stop means secured to said main mould portion, a member secured to said subsidiary mould portion and arranged for abutment against said stop means whereby to determine exactly said extreme position, and a forked plate secured to said main mould portion for cooperation with said member for orientation thereof in a direction transverse to its direction of movement.

In another aspect, the invention consists of a glass bending mould having a main mould portion, at least one subsidiary mould portion pivotally connected to said main mould portion, means tending to urge said subsidiary mould portion to one extreme position of pivoting, stop means secured to said main mould portion, and a member secured to said subsidiary mould portion and arranged for abutment against said stop means whereby to determine exactly said extreme position, characterized in that said stop means comprise a bracket secured to said main mould portion, a screw engaging a tapped hole in said bracket, a plate secured to said screw and provided with at least one hole arranged each for alignment with a second hole in said bracket, a pin extending through said hole of the plate and said second hole in said bracket, and means for retaining said pin in such position.

Glass bending moulds normally fall into one of two classes—concave or convex moulds—depending upon whether the glass is cradled within a concavely curved mould or wrapped around a convex one. The present invention is directed towards improvements in mould construction primarily applicable to the concave type of mould and for this reason the invention will be exemplified below with reference to a concave mould. The basic essentials of the present invention, are, however, equally applicable to a convex mould as will become apparent from the description below.

One half of a typical concave skeleton mould to which the invention may be applied is illustrated in the accompanying drawings. Reference may be had to United States patent application Serial No. 591,913, filed June 18, 1956, now Patent No. 2,861,396, dated November 25, 1958, for description of the general features of construction and operation of this mould and, in particular, of the movable end portions thereof.

In these drawings:

Figure 1 shows a plan view of a fragment of a main side bar of the mould with parts constructed in accordance with the invention secured thereto; and Figure 2 shows a front view of these parts, as seen from the lower side of Figure 1.

Figure 3 shows a plan view of the mould half, incorporating the structure illustrated in Figures 1 and 2, and showing the mould in the initial "flat" position of the parts prior to bending of glass thereon;

Figure 4 is a side view of the mould half seen in Figure 3, with the parts in the same position; and Figure 5 is a view similar to Figure 4 but with the parts in the "curved" position assumed after bending of the glass.

The other half of the mould is identical in mirror image, and has thus not been illustrated.

The main side bars of the mould are each designated by the reference numeral 1, the movable end portion at the end of the mould visible in the drawings being shown generally at 2. This movable end portion 2 is itself composed of two relatively movable mould portions 3 and 4. The detailed structure of the end portion 2 of the mould and the nature of the relative movement between the sections 3 and 4 form the subject matter of copending United States patent application Serial No. 591,913, filed June 18, 1956, now Patent No. 2,861,396, dated November 25, 1958, and will not be elaborated upon further in this specification. Suffice to say that the mould section 3 consists of side bars 5 each of which is arranged, in the concave position of the mould (Figure 5) to form a contiguous, smooth continuation of a main side bar 1. The end of each side bar 5 adjacent the end of a main side bar 1 is secured by suitable struts 5a to an arched bracket 6 to which there is further secured an arm 7 extending generally away from the end portion 2 and, when the parts are in the "flat" position of Figures 3 and 4, upwardly at an angle approximately equal to that through which it is desired to pivot the end portion 2 of the mould. Reinforcing side plates 8 are secured to each side surface of each such bracket 6. A vertically disposed upstanding plate 9 is secured to the end of each main side bar 1 to extend perpendicularly outwardly therefrom. The upper edge of each plate 9 is rounded off to semi-circular cross-section and serves to define the axis about which the end portion 2 of the mould rotates. The inner apices of the bracket 6 and the reinforcing plates 8 are made similarly arcuate to form a complementary surface that will be readily able to slide smoothly over the upper edges of the plates 9 on pivotal movement of the end portion 2 of the mould between the positions seen in Figures 4 and 5. Each plate 9 terminates at its outward end in an upwardly projecting finger 9a. The two fingers 9a approximately determine the transverse alignment of the end portion 2 in relation to the main portion of the mould with a view to ensuring registration of the side bars 1 and 5, but it is impracticable in the construction of these parts, particularly having regard to the temperature range over which they must operate, to avoid some freedom of relative movement in the transverse direction, that is to say in the direction of the axis of pivoting of the end mould portion 2 relative to the main mould portion.

Weights 10 are secured to the extreme ends of the two arms 7, these arms being disposed outwardly of the side bars 1 of the mould, as best seen from Figure 3, in order to be free to move downwardly without encountering the glass sheet which overlaps the edges of the bars 1 by a small amount (generally about ½ an inch). Normally, in practice, when the mould is being employed as a step in the manufacture of laminated windshields, two sheets of glass, one on top of the other, will be laid along the top of the mould so as to be bent simultaneously and thus always match one another perfectly. This pair of glass sheets is shown diagrammatically by broken lines 11 in Figures 4 and 5. The weight and rigidity of the glass 11 will prevent upward movement of each end portion 2 of the mould, the tip 26 of which end portion presses upwardly against the underside of the glass 11 at its extreme end. The parts will remain in the positions seen in Figure 4 against the force exerted by the weights 10, until the glass begins to soften as a result of increasing temperatures that it encounters on being fed on a continuously moving belt through an oven. Gradually the upward bending force exerted by the weights 10 will take charge and the glass will allow each of the end portions 2 to swing slowly and uniformly upward, until the two arms 7 each come to rest on one of a pair of adjustable stops 54 mounted each on the outside of one of the side bars 1 of the mould. The parts will then be in the position shown in Figure 5 and the glass will be smoothly bent to the required shape. It will be noted that the main body of the glass sags sufficiently to bring its edges into contact with the full length of the side bars 1.

The parts with which the present invention are concerned consist of a bracket 50 (see also Figures 1 and 2) secured directly to a side bar 1 and also supported by a strut 50a, such bracket 50 being composed of a flat horizontally disposed plate extending transversely away from the side bar 1. The bracket 50 also includes a portion 51 extending towards the adjacent end portion 2 of the mould. This portion 51 terminates in an upwardly bent forked plate 52. The centre of the main portion of the bracket 50 is tapped to receive a screw 53 formed with an enlarged flat head 54 in which is provided a number of holes 55. A single small untapped hole is formed in the bracket 50 at a convenient point beneath a point through which each of the holes 55 will pass on rotation of the screw 53. The assembly is then completed by a pin 56 which may be passed down through one of the holes 55 in alignment with the hole in the plate 50 to be secured against accidental removal by a cotter pin 57. This arrangement provides a very convenient and secure method of varying the height of the head 54.

The upper surface of the head 54 is positioned to act as a stop for the weight-bearing arm 7 that controls upward movement of the end portion of the mould into the concave position. This arm 7 has been shown in Figure 2, which thus corresponds to Figure 5 position, but omitted from Figure 1 for clarity, which thus corresponds to the Figure 4 position. It is important accurately to determine the extent of downward movement of the arm 7, because it is in this manner that the exact shape of the final glass product is determined. The upwardly projecting forked plate 52 of the bracket 50 serves as a guide to ensure that the arm 7 is accurately located in a direction transverse to the main longitudinal direction of the mould. Although transverse positioning of the end mould portion in relation to the main mould portion will basically be determined by the knife edge hinge means, previously described, there will, in practice, inevitably be some transverse play in the hinge connection, and the forked plate 52 serves as a further means to restrict this play within very definite predetermined limits. It will be more simple to avoid play between the arm 7 and the two forked arms of the plate 52, than to eliminate play in a hinge or other form of pivotal connection. The arm 7 will never normally come into contact with the extreme bottom 52a of the trough of the fork formed in the plate 52, since it will be arranged to strike the head 54 first.

Attempts have been made in the past to lock a screw such as the screw 53 in position on a bracket on a glass-bending mould, by lock nuts, but this has not been found satisfactorily to endure the temperatures experienced in a glass moulding oven. The extremes of temperature either loosen the lock nut, thus allowing the screw 53 to turn, or bind it so tight that difficulty is experienced in removing it to change the setting. With the present system it is a simple matter to remove the cotter pin 57, slide upwardly the main locking pin 56, rotate the screw 53 to the new required position and then replace the pins 56 and 57. In this manner the height of the head 54 can be accurately determined, while adjustment within close limits is possible. Conventional bracing members 16 extend between the side bars 1 and between parts of the end portion 2 such as side bars 5. Conventional supporting legs 41 are also provided.

I claim:

1. A glass bending mould having a main mould portion, at least one subsidiary mould portion, pivot means comprising a first pivot element on said main mould portion and a second pivot element on said subsidiary mould portion, said second pivot element co-operating with said first pivot element for mounting said subsidiary mould portion to pivot about said main mould portion, said pivot elements co-operating with each other with substantial freedom of relative movement in the direction of the axis of such pivoting, means tending to urge said subsidiary mould portion to one extreme position of pivoting, adjustable stop means secured to said main mould portion, a member secured to said subsidiary mould portion and arranged for abutment against said stop means whereby to determine exactly said extreme position, and a forked plate secured to said main mould portion for co-operation with said member for more accurate orientation thereof in the direction of said axis of pivoting than is provided by said pivot elements.

2. A glass bending mould having a main mould portion, at least one subsidiary mould portion pivotally connected to said main mould portion, means tending to urge said subsidiary mould portion to one extreme position of pivoting, stop means secured to said main mould portion, and a member secured to said subsidiary mould portion and arranged for abutment against said stop means whereby to determine exactly said extreme position, characterised in that said stop means comprise a bracket secured to said main mould portion, a screw engaging a tapped hole in said bracket, a plate secured to said screw and provided with at least one hole arranged each for alignment with a second hole in said bracket, a pin extending through said hole of the plate and said second hole in said bracket, and means for retaining said pin in such position.

3. A glass bending mould having a main mould portion, at least one subsidiary mould portion pivotally connected to said main mould portion, a weight tending to urge said subsidiary mould portion to one extreme position of pivoting, an arm connecting said weight to said subsidiary mould portion, and stop means secured to said main mould portion in the path of travel of said arm whereby to determine exactly such extreme position, characterised in that said stop means comprise a bracket secured to said main mould portion, a screw engaging a tapped hole in said bracket, a head on said screw in the form of a flat plate provided with a plurality of holes arranged each for alignment with a second hole in said bracket, a pin extending through one hole of said plate and said second hole in said bracket, and means for retaining said pin in such position.

4. A glass bending mould having a main mould portion and at least one subsidiary mould portion, pivot means comprising a first pivot element on said main mould portion and a second pivot element on said subsidiary mould portion, said second pivot element co-operating with said first pivot element for mounting said subsidiary mould portion to pivot about said main mould portion, said pivot elements co-operating with each other with substantial freedom of relative movement in the direction of the axis of such pivoting, a weight tending to urge said subsidiary mould portion to one extreme position of pivoting, an arm connecting said weight to said subsidiary mould portion, adjustable stop means secured to said main mould portion in the path of travel of said arm whereby to determine exactly such extreme position, and an upstanding forked plate secured to said main mould portion for cooperation with said arm for more accurate positioning thereof in the direction of said axis of pivoting than is provided by said pivot elements.

5. A glass bending mould as claimed in claim 4 wherein said forked plate is formed as a part of a bracket secured to said main mould portion, said stop means comprising a screw engaging a tapped hole in said bracket and a flat head for said screw disposed in alignment with the trough of said forked plate, said head being provided with at least one hole arranged each for alignment with a second hole in said bracket, a pin extending through said hole of the head and said second hole in the bracket, and means being provided for retaining said pin in such position.

References Cited in the file of this patent

UNITED STATES PATENTS

| | | |
|---|---|---|
| 2,551,606 | Jendrisak | May 8, 1951 |
| 2,633,673 | Bamford et al. | Apr. 7, 1953 |
| 2,736,140 | Black | Feb. 28, 1956 |